Aug. 12, 1952        F. TRATZIK         2,606,737
                     LUBRICATED VALVE

Filed April 12, 1946                    2 SHEETS—SHEET 1

Frederick Tratzik
INVENTOR.

BY
Cushman, Darby & Cushman
ATTORNEYS

Aug. 12, 1952  F. TRATZIK  2,606,737
LUBRICATED VALVE

Filed April 12, 1946  2 SHEETS—SHEET 2

Frederick Tratzik
INVENTOR.

BY
Cushman, Darby & Cushman
ATTORNEYS

Patented Aug. 12, 1952

2,606,737

UNITED STATES PATENT OFFICE 2,606,737

LUBRICATED VALVE

Frederick Tratzik, Decatur, Ill., assignor to Mueller Co., Decatur, Ill., a corporation of Illinois Application April 12, 1946, Serial No. 661,774

4 Claims. (Cl. 251—93)

The present invention relates to lubricated valves.

Objects of the invention are to provide a valve which includes an arrangement to automatically move lubricant to the seating surface, will provide an extremely efficient seal in a flow line under pressure, and which may be readily operated even when used with extremely high line pressures.

Other objects and advantages of the invention will be apparent from the following specification and accompanying drawings wherein.

Figure 1:
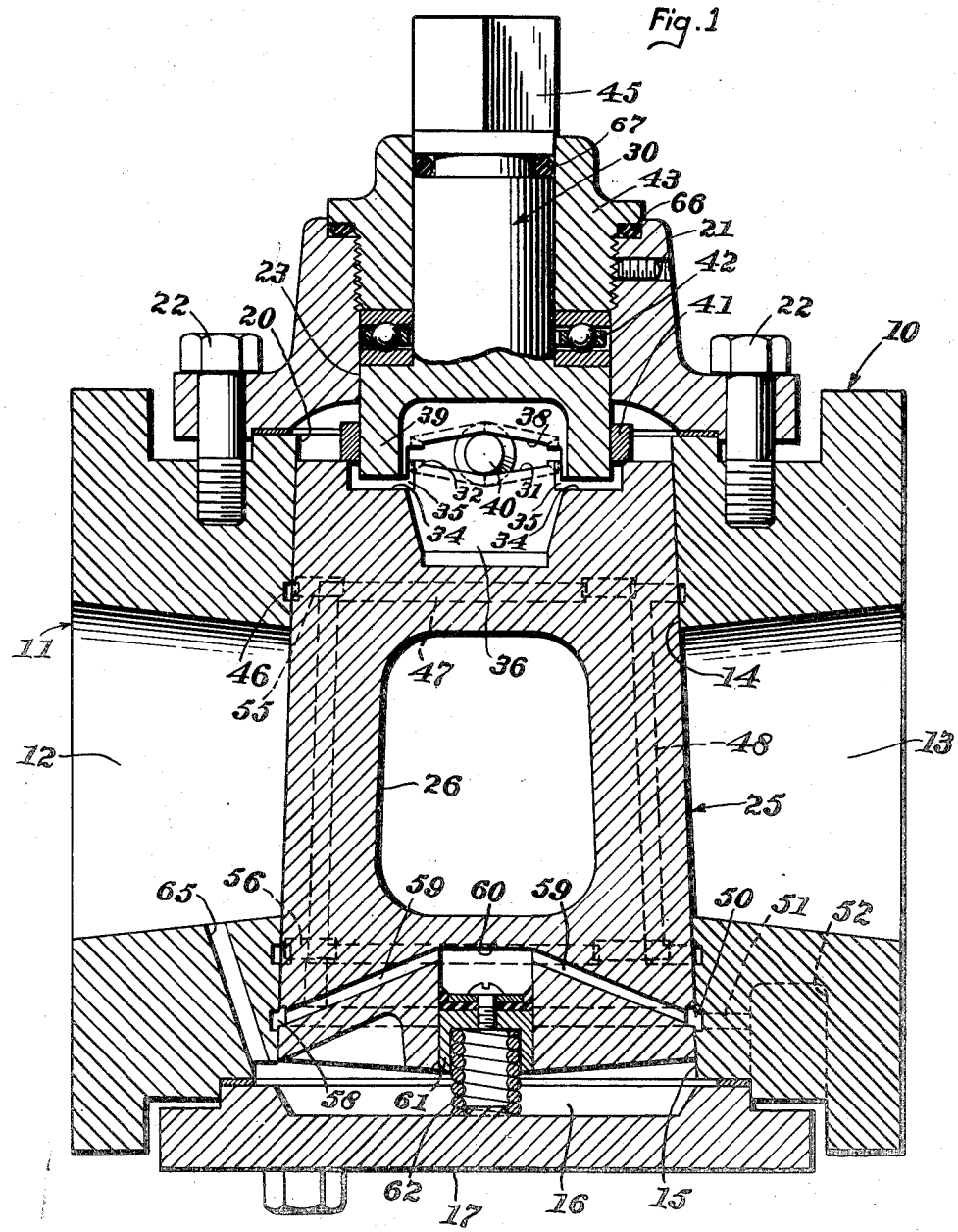
Figure 1 is an axial section through a valve of the present invention.
Figure 2:
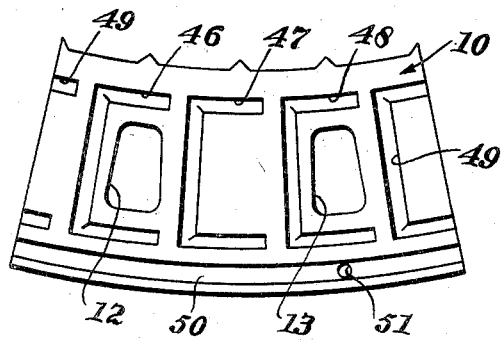
Figure 2 is a developed view of the valve casing member seating surface.
Figure 3:
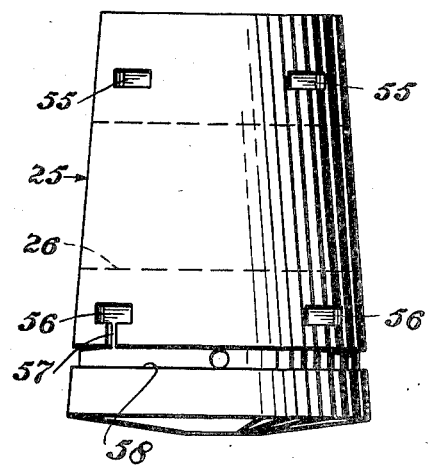
Figure 3 is an elevation of a valve plug.

Referring to Figures 1 to 3, the numeral 10 designates the valve casing member which is provided with a flow passageway 11 including an inlet 12 and an outlet 13. A tapered valve seat bore 14 extends transversely of the flow passageway 11, the larger end 15 of the seat bore opening to a chamber 16 which is closed at its outer end by a plate or cap 17 secured in position by means of bolts. A gasket may be provided between the plate 17 and casing member. A stop block, not shown, may extend upwardly from the plate 17 to limit rotation of the valve plug or element through 90°.

The smaller end 20 of the seat bore 14 also extends through the casing member 10 but is closed by a bossed plate 21 secured to the casing by circumferentially spaced bolts 22 such as shown in Figure 1. Plate 21 includes a bore 23 of a smaller diameter than the smaller end 20 of the seat bore 14.

A tapered plug 25 or valve member is mounted in the seat bore 14, the plug including a flow port 26. The smaller end of the plug 25 is so formed as to cooperate with a similar structure provided on the inner end of an operating stem 30. This arrangement, which causes the plug or valve element to initially move axially when any rotating force is applied thereto, is described in detail in the application of Walter J. Bowan and Frederick Tratzik, for Valves, Serial No. 611,465, filed August 20, 1945, which matured to Patent No. 2,510,494 on June 6, 1950. For the purpose of the present invention, this operating arrangement may be described as follows: The smaller end of the plug includes a pair of diametrically opposite and concentric concave cam surfaces 31 each of which is of V-shaped form. As best shown in Figure 1, the cam surfaces 31 are inclined at an acute angle to a radius of the plug, with their point of greatest depth at the seating surface of the plug.

The cam surfaces 31 extend through an arc of somewhat less than 60° as best shown in Figures 1 and 3 and, at their ends, have shoulders 32 extending upwardly to the flat end surface of the plug. Midway between the cam surfaces 31, that end of the plug is provided with diametrically opposite recesses or pockets 34 including end walls 35 which extend radially of the plug. The diametrically opposite cam surfaces 31 and the diametrically opposite recesses 34 are arranged about a circular line concentric with the plug axis.

The radially inner edges of the cams 31 may be defined by a central socket 36 in the plug. The end shoulders 32 of the cam surfaces 31 and the end walls 35 of the recesses 34 lie in planes which lie on the axis of the plug.

The operating stem or element 30 is equipped with two concave, arcuate and V-shaped cam surfaces 38, each of which will normally lie directly opposite the respective plug cam surface 31. As shown in Figure 1, two diametrically opposite projections 39 are integral with the stem 30, these projections and an adjacent cam surface 38 being spaced 90° so that a projection 39 will extend into each recess 34 of the plug. Each projection 39 includes a shoulder at each end thereof and these shoulders lie in planes which lie on the axis of the stem. As is explained in said Bowan and Tratzik application, the projections 39 are of a length circumferentially of the plug which is less than the corresponding dimension of the recesses 34. In this way, the projections 39 have a loose fit with respect to the recesses and circumferentially of the plug and operating element 30. A roller 40 is positioned between each pair of axially opposed cam surfaces 31 and 38, the rollers being of tapered formation to conform to the surfaces of the cams and rounded at their outer ends so that they will have a single point bearing upon the inner cylindrical surface of a holding ring 41 which fits about the inner end of the operating stem or element 30. The rollers 40 are held in proper position radially of the cam surfaces by the ring 41 and, because the rollers are tapered, no other securing means is required to maintain them in position.

As shown in Figure 1, the operating stem 30 is of reduced diameter at its outer end to provide an outwardly facing shoulder thereon within the bore 23 of bossed plate 21, and a roller bearing assembly 42 is positioned between this shoulder and a retainer sleeve 43. Retainer sleeve 43 is threaded in the bore 23 of the plate 21 and, at its outer end, is provided with flat surfaces adapted to be engaged by a suitable wrench. Stem 30 extends outwardly beyond the sleeve 43 and may be squared as indicated at 45 to receive an operating handle or wrench. Sleeve 43 serves to hold stem 30 against outward movement.

As best shown in Figure 2, the seating surface 14 of the valve casing member 10 is provided with four C-shaped grooves 46, 47, 48 and 49, respectively. The longitudinally extending portions of these grooves are spaced ninety degrees apart about the seating surface but the free ends of the circumferentially extending portions of each C-shaped groove are spaced from the longitudinal portion of the next adjacent C-shaped groove. It will be observed from Figure 2 that the grooves 46 and 48, respectively, enclose the inlet passage 12 and outlet passage 13, and that each passage is equidistantly spaced between the longitudinal portion of two grooves. A groove 50 extends circumferentially of the casing member seat between the larger end of the seat and the C-shaped grooves. A radial passage 51 extends from the groove 50 to a grease supply fitting chamber diagrammatically indicated at 52 in Figure 1.

As best shown in Figure 3, the valve plug 25 has four arcuate grooves 55 equidistantly spaced about its small end at a point between the small end of the plug and the flow port 26. These grooves are only of sufficient length circumferentially of the plug that they will bridge the corresponding ends of the C-shaped grooves when the plug is in either open or closed position. The large end of the plug 25 has four short arcuate grooves 56 equidistantly spaced thereabout at a point between the large end of the plug and the flow port 26. Two diametrically opposed short grooves 56 have ducts 57 extending therefrom to a circumferential groove 58 which encircles the plug 25 between the ducts 56 and the larger end of the plug. It will be observed from Figure 1 that the circumferential grooves 50 and 58 are of such width that they will overlap in any axial position of the plug.

As is best shown in Figure 1, two diametrically aligned passages 59 lead from the plug groove 58 to the inner end of a chamber 60 within the plug. The chamber 60 is a cylindrical and centrally located recess opening to the larger end of the plug and is closed by a piston or impulse member 61 including a packing to form a seal with the side walls of the chamber. The piston 61 is outwardly flanged to bear upon the inner end of a coil spring 62 which seats upon the cap plate 17.

In the operation of the above device, the plug will be held seated by line pressure flowing from the inlet passage 12 through a port 65 which opens to the chamber 16 at the larger end of the plug.

In use, the lubricating groove system will be filled with grease by a pressure gun connected to the grease fitting chamber 52, the grease then moving through the radial passage 51 to the opposed circumferential grooves 50 and 58. From the latter, the supply of grease will move through the radial passages 59 to the chamber 60. When the plug is in the closed position illustrated in Figure 1, or in full open position, grease will also move through the short passages 57 to the corresponding ducts 56 to fill the C-shaped grooves. Enough grease will be supplied through the grease fitting chamber 52 to entirely fill the groove system as well as the lubricant chamber 60.

When the plug is to be operated, a suitable operating element will be fitted upon the outer end of the operating stem 30 to rotate the latter. As is described in the above mentioned Bowan and Tratzik application, the initial rotation of the stem 30 will cause the plug to move axially so that it will be slightly unseated. When the plug has been sufficiently unseated to overcome resistance to turning, it will then rotate with the stem 30, generally by engagement of the lugs 39 with the side walls 35 of the recesses 34. When the plug is moved axially as has just been described, the inner wall of the lubricant chamber 60, i. e., the upper wall of Figure 1, will be moved toward the piston member 61. Because the spring 62, even when expanded from the tightly coiled showing of Figure 1, exerts considerable force on piston 61, movement of chamber 60 with respect to the piston member will cause a high pressure to be exerted upon the lubricant in the chamber 60, thereby forcing additional lubricant to the seating surface of the valve. This additional lubricant will assist the rotation of the plug and will also increase the supply of lubricant on the seating surface to thereby maintain the seating surfaces properly sealed. It will be observed that during the above movement of the plug toward piston member 61, the plug itself has a piston effect, so that the grease is between what may be regarded as opposed pistons.

Movement of lubricant from the chamber 60 by the axial movement of the plug just described naturally will result in a loss of lubricant from chamber 60. This will be compensated for by expansion of the spring 62, which will force the piston 61 against the lubricant in the chamber and maintain the lubricant in the entire system under proper pressure. It eventually will be necessary to furnish additional lubricant to the chamber 60 through the grease gun fitting supporting chamber 52. However, large valves used in high pressure lines are not operated at frequent intervals and a long period of time may pass before the supply of lubricant in the chamber 60 is so reduced as to require replenishment through chamber 52.

It will be observed that the spring 62 comprises a means for establishing a desired pressure on the lubricant in the system.

In order to prevent leakage between the retainer sleeve 43 and the bossed plate 21, a packing ring 66 of the character described in the above-mentioned Bowan and Tratzik application is provided between these two surfaces. Leakage along the stem 30 is prevented by a packing ring 67 corresponding to that described in said earlier application. As is explained in said application, the ring 66 is of such character that the retainer sleeve 43 may be slightly backed out to permit some play between the cams 38 and the rollers 40 so that the valve plug may be fully seated, all without permitting leakage past the packing 66.

Figure 4:
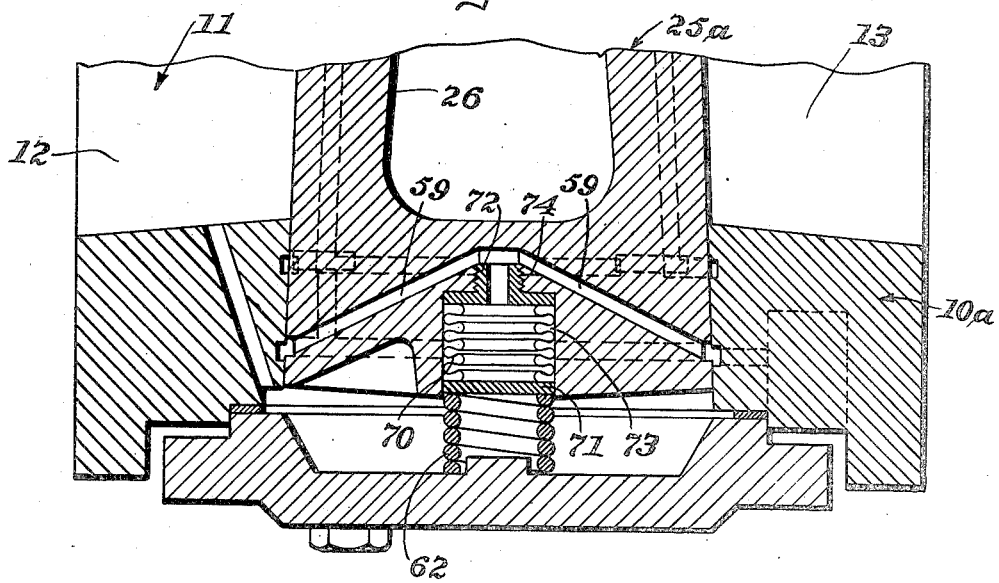
Figure 4 is an axial section through a modified valve of the invention.

The valve 10a illustrated in Figure 4 is identical with that disclosed in Figures 1 to 3 except that a bellows sleeve 70 including an outer end plate 71 and an apertured inner end plate 72 is provided instead of the piston chamber 60 of Figures 1 to 3. In more detail, the plug 25a of Figure 4 is provided with a central bore 73 at its larger end with an inner and threaded counter bore 74 opening to the passages 59. The inner plate 72 of the bellows device 70 includes a threaded boss which will engage the threaded counter bore 74 to hold the bellows in the bore 73. The outer end of the outer end plate 71 of the bellows device will bear upon the coil spring 62.

The operation of the structure disclosed in Figure 4 is identical with that of Figures 1 to 3 except that the bellows device 70 will enclose or receive the grease which in the form of Figure 1 will be positioned above the piston 61.

It will be observed that the outer wall member 71 of the bellows element 70 has a piston effect which will be opposed to the inner wall 72 of the bellows element fixed to the plug 25a.

The terminology used in the specification is for the purpose of description and not of limitation, the scope of the invention being defined in the claims.

I claim:

1. In a valve, a casing element provided with a flow passage and a tapered seat bore, a tapered and ported plug mounted in the seat bore, a lubricant chamber within the larger end of the plug, a member closing the outer end of said chamber, means mounted in the casing element to supply lubricant to the chamber, a lubricant groove system in the seating surfaces of the plug and casing element and communicating with the chamber, means to unseat the plug during rotation thereof to thereby move the plug and chamber toward said member which closes the outer end of the chamber, and resilient means positioned between said casing element and said member which closes the outer end of the chamber to hold said member substantially stationary during unseating of the plug so as to force lubricant from the chamber to the lubricant groove system upon unseating of the plug and to urge said member constantly toward the inner end of the chamber when the plug is seated and a passage extending from the casing element flow passage to the larger end of the plug.

2. A valve of the character described in claim 1 wherein the lubricant groove system includes passages to surround each flow passage in closed or opened position of the plug and the lubricant chamber communicates with the lubricant passages.

3. A valve of the character described in claim 1 wherein said member for closing the outer end of the lubricant chamber comprises a piston movable in the chamber.

4. A valve of the character described in claim 1 wherein the lubricant chamber and the member for closing its outer end are included in a bellows device.

FREDERICK TRATZIK.

REFERENCES CITED

The following references are of record in the file of this patent:

UNITED STATES PATENTS

| Number | Name | Date |
|---|---|---|
| 1,998,029 | Simpson | Apr. 16, 1935 |
| 2,070,490 | Nordstrom | Feb. 9, 1937 |
| 2,086,946 | Rick | July 13, 1937 |
| 2,169,525 | Goldberg | Aug. 15, 1939 |
| 2,169,810 | Mueller | Aug. 15, 1939 |
| 2,281,697 | Kerr | May 5, 1942 |
| 2,289,722 | Mueller | July 14, 1942 |
| 2,321,233 | Mueller | June 8, 1943 |